US008360130B2

(12) United States Patent
Cannaverde et al.

(10) Patent No.: US 8,360,130 B2
(45) Date of Patent: Jan. 29, 2013

(54) ACTIVE TENSION DEVICE FOR A WINDOW COVERING

(75) Inventors: Joseph Cannaverde, Stamford, CT (US); Roger Redin, Stamford, CT (US)

(73) Assignee: Rollease Inc., Stamford, CT (US)

( * ) Notice: Subject to any disclaimer, the term of this patent is extended or adjusted under 35 U.S.C. 154(b) by 0 days.

(21) Appl. No.: 13/071,556

(22) Filed: Mar. 25, 2011

(65) Prior Publication Data

US 2011/0168338 A1 Jul. 14, 2011

Related U.S. Application Data

(63) Continuation of application No. 12/033,167, filed on Feb. 19, 2008, now Pat. No. 7,931,069.

(51) Int. Cl.

| | |
|---|---|
| ***E06B 9/305*** | (2006.01) |
| ***E06B 9/386*** | (2006.01) |
| ***E06B 9/388*** | (2006.01) |
| ***E06B 9/00*** | (2006.01) |
| ***E06B 9/30*** | (2006.01) |
| ***A47H 1/00*** | (2006.01) |
| ***F16H 55/36*** | (2006.01) |

(52) U.S. Cl. ............. 160/173 R; 160/178.1 R; 160/170; 160/321; 474/171

(58) Field of Classification Search ........... 160/168.1 R, 160/168.1 V, 173 R, 173 V, 178.1 R, 178.1 V, 160/84.04, 321, 24, 344; 474/171; 254/391, 254/392

See application file for complete search history.

(56) References Cited

U.S. PATENT DOCUMENTS

| | | | | |
|---|---|---|---|---|
| 19,226 | A | 1/1858 | Schleier | |
| 3,123,182 | A | 3/1964 | Malone et al. | |
| 3,123,351 | A | 3/1964 | Graber | |
| 4,846,766 | A | 7/1989 | Glatzel | |
| 5,577,543 | A | 11/1996 | Jelic | |
| 5,676,188 | A | 10/1997 | Cadorette | |
| 5,752,558 | A | 5/1998 | Lin | |
| 5,845,696 | A | 12/1998 | Chou | |
| 6,085,824 | A | 7/2000 | Cadorette | |
| 6,463,987 | B1 | 10/2002 | Nevins | |
| 6,792,999 | B2 | 9/2004 | Cross et al. | |
| 6,948,546 | B2 | 9/2005 | Nien | |
| 7,114,544 | B2 | 10/2006 | Rice et al. | |
| 7,931,069 | B2 * | 4/2011 | Cannaverde et al. | ..... 160/173 R |
| 2003/0111188 | A1 | 6/2003 | Cross et al. | |
| 2005/0205219 | A1 | 9/2005 | Hsu | |
| 2009/0205788 | A1 * | 8/2009 | Cannaverde et al. | .. 160/168.1 R |
| 2011/0168338 | A1 * | 7/2011 | Cannaverde et al. | .. 160/168.1 R |

* cited by examiner

*Primary Examiner* — Blair M Johnson
*Assistant Examiner* — Jaime F Cardenas-Garcia
(74) *Attorney, Agent, or Firm* — Gottlieb, Rackman & Reisman, P.C.

(57) ABSTRACT

A tension device that prevents a window covering from operating properly until the tension device is installed. The tension device incorporates a drive wheel, casing, anchoring arm and drive stud. The drive stud has two sections, one keyed and one cylindrical. Before the tension device is installed, the keyed section of the drive stud engages the drive wheel and the casing, thereby preventing them from rotating relative to each other. When the tension device is installed, the drive stud must be inserted into the anchoring arm causing the keyed section of the drive stud to disengage the drive wheel and thereby allow the drive wheel to rotate relative to the casing.

3 Claims, 4 Drawing Sheets

ACTIVE TENSION DEVICE FOR A WINDOW COVERING

This application is a continuation of U.S. Ser. No. 12/033,167, filed Feb. 19, 2008 now U.S. Pat. No. 7,931,069, the content of which is incorporated herein by reference.

FIELD OF THE INVENTION

This application relates generally to a tension device for tensioning the cord used to operate a window covering, and more particularly to a tension device that is adapted to prevent the window covering from operating properly prior to installation of the tension device.

BACKGROUND OF THE INVENTION

Modern window coverings can be raised and lowered for selectively blocking or filtering light in a room. A common method of achieving this result is through the use of one or more control cords. Some control cords have open ends, while others form a closed loop or end.

Both the closed end and open end control cords could be unsafe.

It is also possible for the cords on the opposite side of the control cord to become loose and create a loop large enough to fit the head of a child or pet as is shown in FIG. 3.

One example of a prior art tension device is disclosed in U.S. Pat. No. 6,463,987 to Nevins. But there is a major drawback to the Nevins invention and other current tension devices. These tension devices need to be installed by the operator separately from the window covering itself. Often the operator, for whatever reason, installs the window covering without installing the tension device. When this happens, the advantages of the tension device are lost.

SUMMARY OF THE INVENTION

The present invention provides a window covering with a tensioning device arranged so that the window covering is inoperable unless the tensioning device is properly installed. The tensioning device includes a drive mechanism with two different sections. A first section that is non-keyed and a second section that is keyed. The non-keyed section has fingers which are used to engage the drive wheel and casing and prevent relative rotation between those two elements. The non-keyed section is provided to allow relative rotation between the element it is engaged with and the element the keyed section is engaged with. This way, relative rotation of the wheel and casing can be allowed or prevented based on the positioning of a drive stud.

Before installation, a spring applies a force to the drive stud away from the direction in which it is inserted. This force keeps the drive stud in a position such that the keyed section of the drive stud is engaged with both the drive wheel and the back cover of the casing. The drive wheel is then prevented from rotating relative to the casing and therefore prevents the window covering from operating properly.

When the tension device is installed, a force is applied to the drive stud compressing the spring. This pushes the drive stud deeper into the device and then through the anchoring arm. Ramped ridges at the end of the fingers allow the fingers to pass through the specially designed hole in the anchoring arm, but not to pass back in the opposite direction. The drive stud is now in a position such that the keyed section is engaged with the anchoring arm and the back side of the outer casing, but not the drive wheel. Therefore the drive wheel is free to rotate relative to the casing, allowing the window covering to operate properly.

BRIEF DESCRIPTION OF THE FIGURES

To further satisfy the recited objectives, a detailed description of typical embodiments of the invention is provided with reference to appended drawings that are not intended to limit the scope of the invention, in which.

DESCRIPTION OF THE INVENTION

Figure 1:
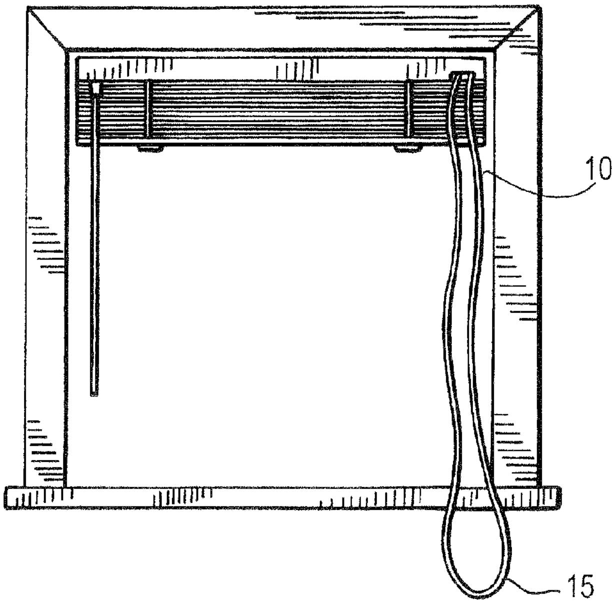
FIG. 1 (PRIOR ART)
FIG. 1 is a front elevation view of a prior art window covering having a continuous loop for a control cord.

FIG. 1 shows a known window covering where the control cord 10 is not attached to a tension control device. Instead, the cord is loose and forms a loop 15 at its lower most section.

Figure 2:
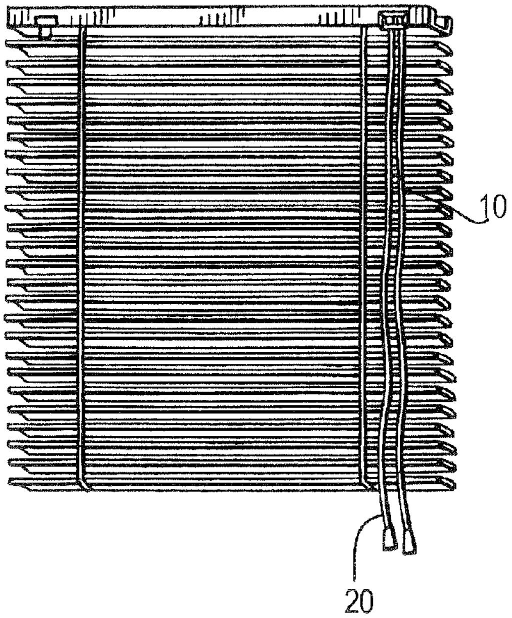
FIG. 2 (PRIOR ART)
FIG. 2 is a front elevation view of a prior art window covering device having two control cords with open ends.

FIG. 2 shows a known window covering with control cords 10 having two open ends 20.

Figure 3:
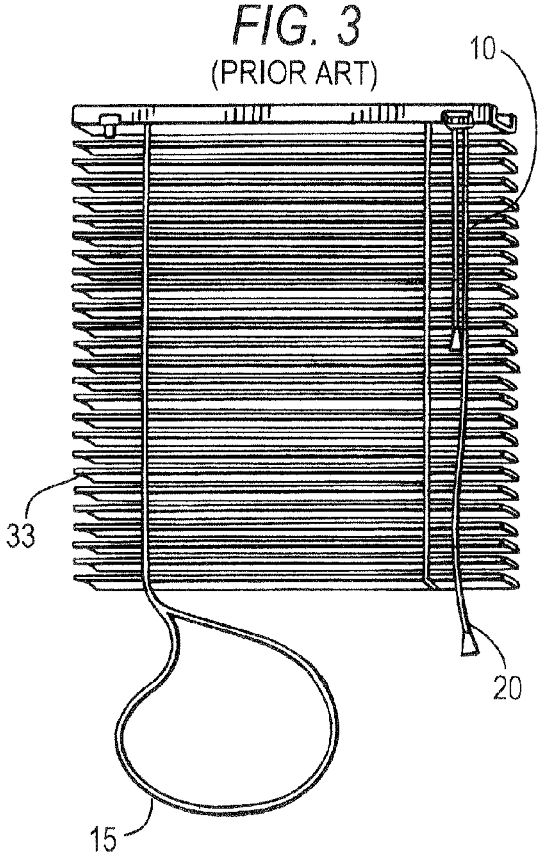
FIG. 3 (PRIOR ART)
FIG. 3 is a front elevation view of a prior art system for controlling the window covering device of FIG. 2 showing a portion of a cord used to hold individual covering elements pulled into a loop.

FIG. 3 shows another situation in which it is also possible for cords used to operate the window covering 33 may become loose and form a loop 15.

Figure 4:
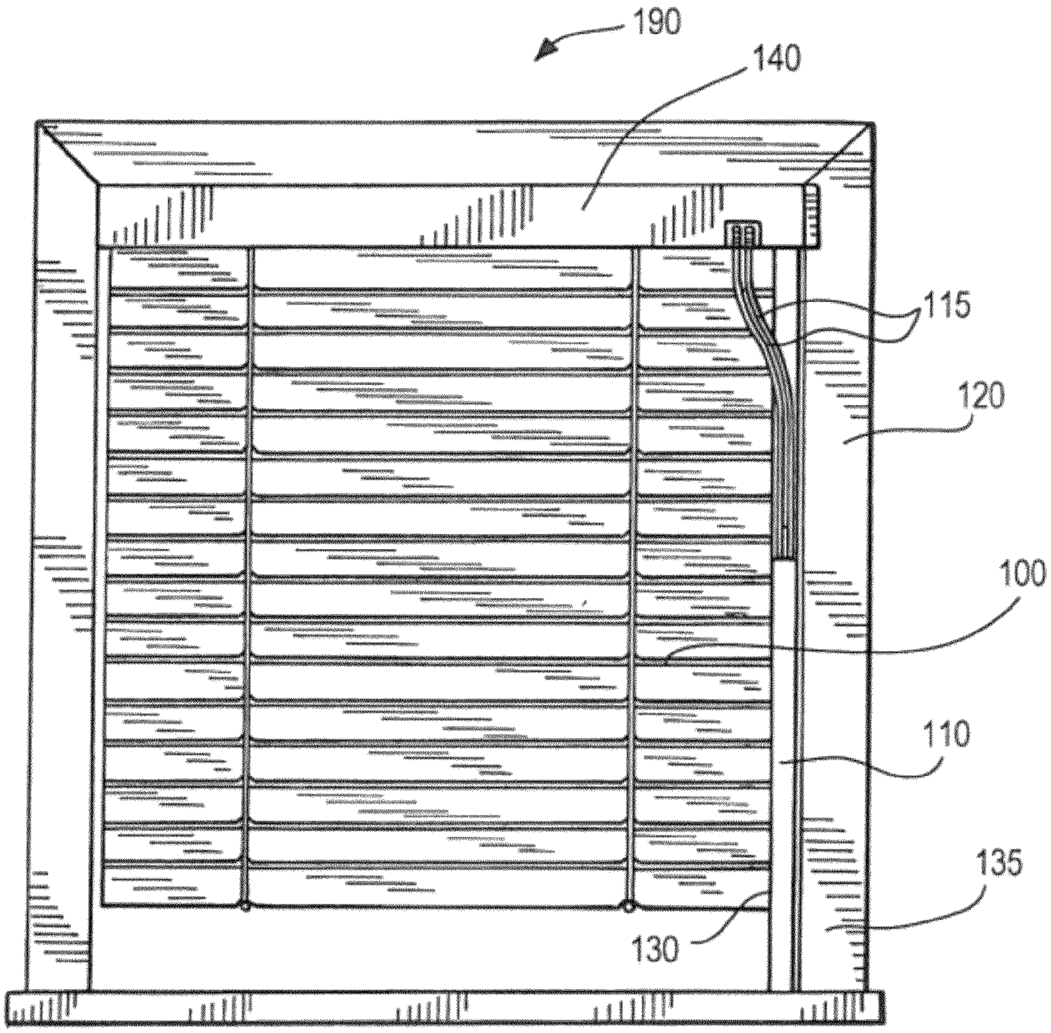
FIG. 4 is a front elevation view of a prior art system for controlling a window covering device mounted adjacent to the window covering device.

FIG. 4 shows a prior art tensioning device for a window 190 with a window covering 100, stationary member or frame 120 and a header 140. This device incorporates a sleeve 110 having a lower end 130 attached to a lower part 135 of frame 120. A control cord 115 from header 140 is encased in the sleeve 110 as shown. This system is effective at preventing a loop from forming in the control cords as seen in FIGS. 1-3. But this system requires significant labor to be installed. The sleeve must be installed separately from the window covering and the window covering could be installed without the sleeve and still operate properly.

Figure 5:
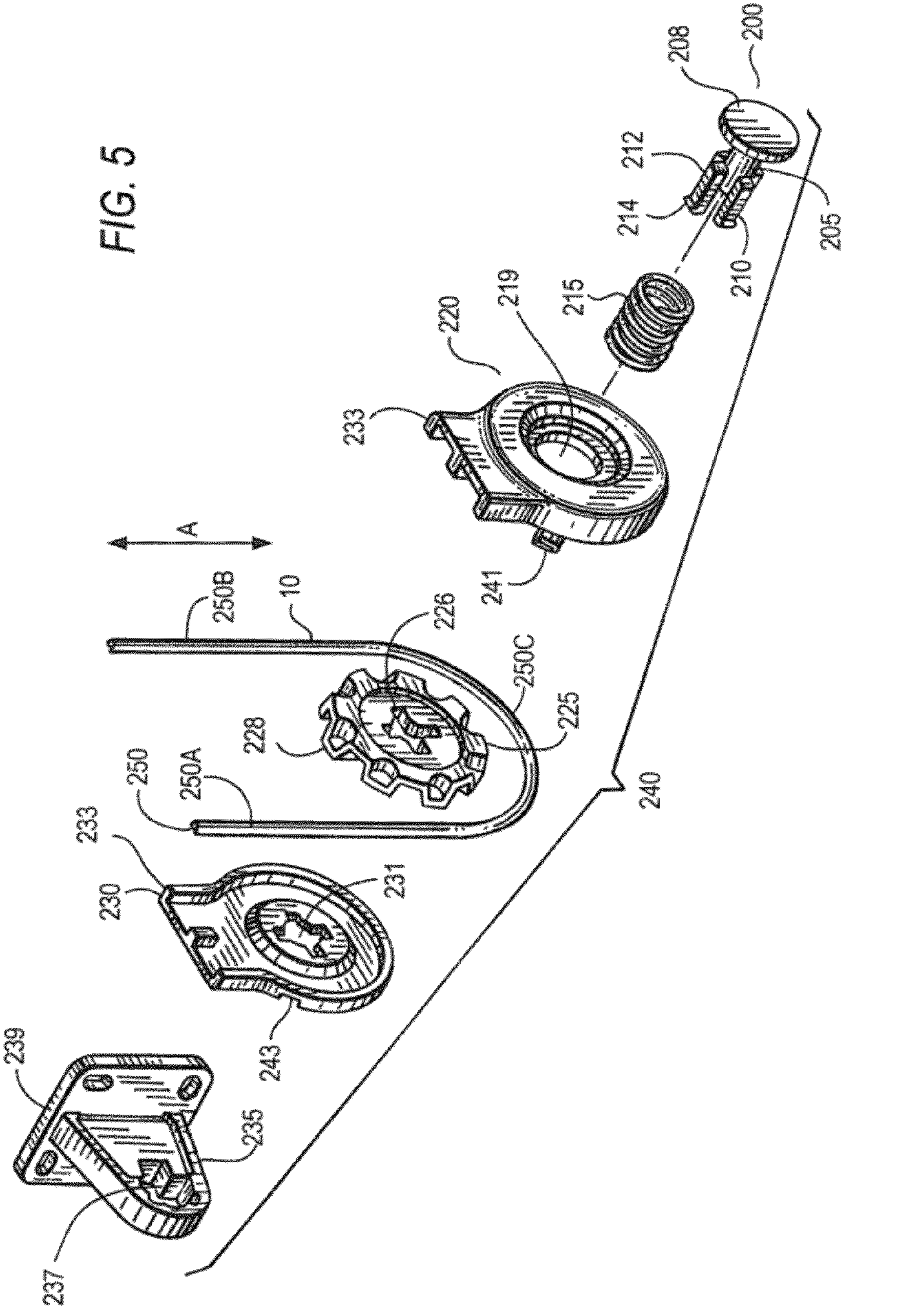
FIG. 5 is an exploded view of the preferred embodiment of the tension device of the present invention.
Figure 7:
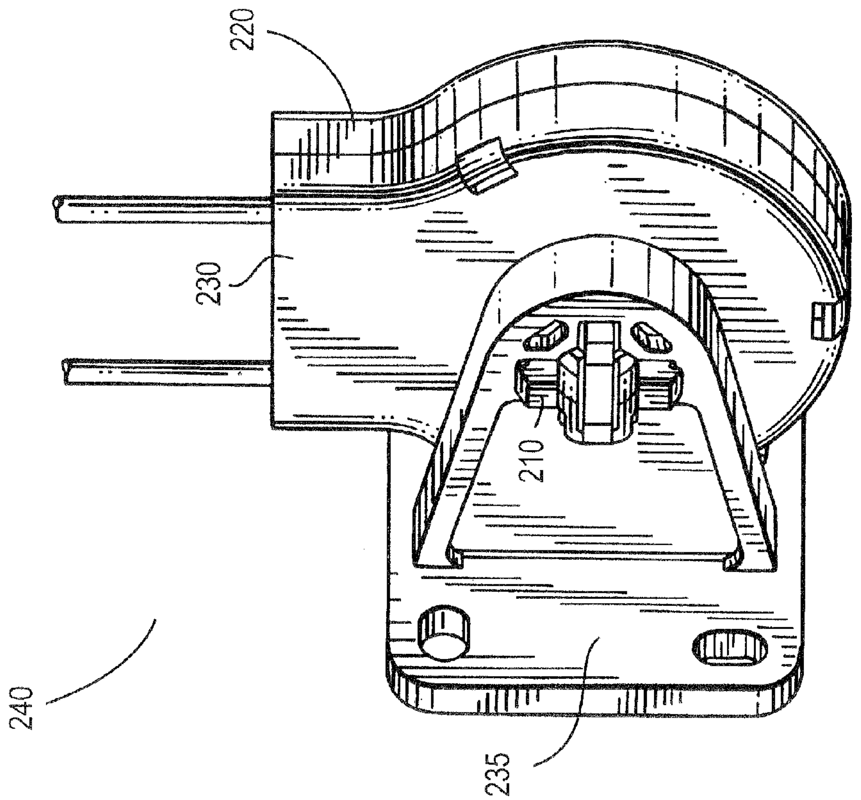
FIG. 7 is a rear perspective view of the preferred embodiment of the tension device of the present invention.
Figure 6:
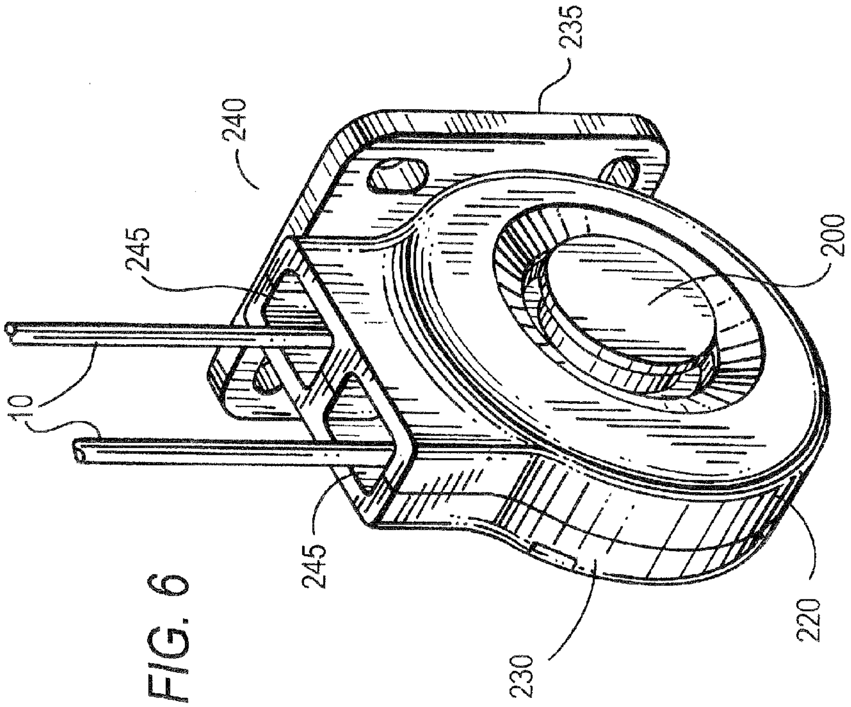
FIG. 6 is a front perspective view of the preferred embodiment of the tension device of the present invention.

FIGS. 5-7 describe the preferred embodiment of the present invention. The tension device 240 includes a drive stud 200. The drive stud comprises an end cap 208, a non-keyed section 205, a keyed section 210 and finger extensions 212. The preferred embodiment of the keyed section is defined by fingers 212 (preferably four) that are located on the exterior of the keyed section 210. These fingers 212 extend beyond the edge of the keyed section going away from the end cap 208. At the far end of each finger 212 is an elevated ridge 214. The elevated ridge 214 is sloped in the front. (The front being the section furthest from the end cap 208). The ridges are shown in the shape of a ramp, but can be constructed in various embodiments. In between the keyed section and the end cap is the non-keyed section 205. This section is preferably cylindrical, but can be constructed in other manners so long as its greatest radius is less than the smallest radius of the holes 219, 226, 231, 237 of a drive wheel or pulley 225, a casing or housing 233 formed of two parts 220, 230 and anchoring arm 235.

While the preferred embodiment of the present invention is to use a four finger type keyed section, the keyed section can be constructed in numerous ways. The important aspect of the keyed section 210 is that this section has a maximum radius greater than the minimum radius of the center holes 219, 226, 231, and 237. Therefore when the keyed section 210 is inserted into the drive wheel 225, the case 233 and/or the anchoring arm 235, the drive stud 200 cannot rotate relative to the respective element(s). There are many possible configurations of the keyed section in addition to the one illustrated herein.

Further, the non-keyed section 205 is preferably cylindrical But the importance of this section is that when aligned with the drive wheel, this section does not engage the center hole 226 of the drive wheel 225. A section that was not cylindrical, but had a cross section with a radius less than the minimum radius of the center hole 226 would be consistent with the present invention.

As shown in FIG. 5, device 240 further includes a drive wheel 225 that has a hole in its center 226. The hole 226 preferably has substantially the same shape and size as the cross section of the keyed section 212. This allows the drive stud 200 to fit directly into the drive wheel 225. Device 240 further includes a case 233 formed of a front section 220 with a hole 219 and a rear section 230. The rear section 230 also has a hole 231 in it configured to fit the drive stud 200. The hole 219 in the front section 220 to be large enough for the keyed section 210 to pass through, but small enough so that the end cap 208 does not pass through.

Before the tension device 240 is installed, the drive wheel 225 is encased between the rear section 230 and the front section 220. The fingers 212 of drive stud 200 passes through the front section 220, the drive wheel 225 and the rear section 230. A spring 215 is provided to keep drive stud 200 in a precise position relative to the drive wheel 225 and outer case 233. The spring 215 is disposed between the outside of the front section 220 and the end cap 208, creating a repulsive force between those two surfaces. This force keeps the keyed section 210 of the drive stud 200 aligned with the drive wheel 225 and the rear section 230 prior to installation. Preferably the spring is a metal coil type spring, but it can be constructed of any material and configured in any manner such that it applies a repulsive force between the front section 220 and the end cap 208.

In this configuration, the keyed section 210 of the drive stud 200 is engaged with both the drive wheel 225 and rear section 230, thereby preventing the drive wheel 225 from rotating relative to the casing 233.

The drive wheel 225 has spokes 228 that grip the cord of a window covering 10. In order for the cord to move relative to the tension device 240, the drive wheel 225 must rotate relative to the case 233. As explained above, when the keyed section 210 of the drive stud 200 is engaged with the drive wheel 225 and the back side of the outer casing 230, the drive wheel 225 cannot rotate relative to the back side of the outer casing 230. Therefore, this configuration also prevents the cord 10 from moving relative to the tension device 240.

Device 240 further includes an anchoring arm 235 with a bracket 239. The anchoring arm 235 has a hole 237 in its center in the shape of the cross section of the keyed section 210 of the drive stud 200. Initially, device 240 is shipped (normally together with the window covering) with the cord disposed partially within the case 233. The cord is turned around the gear 228. Prior to installation, the case 233 is separate from the anchoring arm 235. Before completing the installation, the arm 235 is mounted on a flat (vertical) surface by bracket 239. The last step of the installation consists of aligning the casing 233 with the anchoring arm 235 and applying a force to the end cap 208 causing the fingers 212 of the drive stud to pass through hole 237 in the center of the anchoring arm 235. The fingers 212 are squeezed together as they pass through hole 237 because the ridges 214 are slightly wider than hole 237. But because of the slanted nature of the ridges 214 and the flexibility of the fingers 212, the fingers 212 are squeezed towards the center and pass through the hole.

FIG. 7 shows the preferred embodiment of the present invention with the drive stud 200 connecting the tension device to the anchoring arm 235. The ridges 214 exit the back of the case 233 forming an interference fit between the drive stud 200 and the anchoring arm 235. Thereby preventing the entire drive stud 200 from being removed from the anchoring arm 235 and keeping the drive stud 200 in a fixed position.

The elements of device 240 are sized and shaped so that prior to the mounting of the drive stud 200 into the anchoring arm 235, the drive wheel 225 is immobilized. As the drive stud 200 is advanced through the case 233, the fingers 212 extend outwardly of the case and into the anchoring arm 235. The fingers 212 also move through and past the drive wheel 225. Once passed through the hole 237, the fingers are at a position where they engage the anchoring arm 235 and the rear section 230, but do not engage the drive wheel 225. The non-keyed section 205 of the drive stud 200 is now disposed within the hole 226 of the drive wheel 225. The non-keyed section 205 is cylindrical with a radius less than the minimum radius of the hole 226. This allows the drive wheel 225 to freely rotate (both clockwise and counter-clockwise) relative to the drive stud 200, which is fixed relative to the case 233 and anchoring arm 235. Since the drive wheel 225 can rotate freely, the cord and the window covering are free to operate properly. More particularly, the cord 10 includes a lower section 250 including two parallel portions 250A, 250B and an intermediate portion 250C trained around the wheel 225 as shown. Once the case 233 is fully mounted on the anchoring arm 235, the wheel 225 is free to rotate and hence the cord 10 can be moved up or down, as indicated by arrow A. The drive stud 200 thus forms a disabling mechanism that moves at an angle with respect to the cord parallel portions 250A, 250B and defines two configurations with the wheel 225, with the wheel interfering with the movement of the cord in the first configuration and the cord being free to move with respect to the device 240 in the second configuration. As shown in the drawings, the two cord portions 250A, 250B define a plane with the drive stud moving at angle (that is substantially perpendicular to the plane between the two configurations.

FIGS. 6-7 show the tension device in use. FIG. 6 shows the drive stud 200 pass through the front section 220 and the rear section 230. (The drive stud has been passed through the drive wheel 225, but the drive wheel 225 is hidden from view when the front section 220 and rear section 230 are joined.) The control cords 10 wrap around the drive wheel 225 and pass through the two openings 245.

In the preferred embodiment described herein, the front section 220 has two fingers 250 which protrude towards its inner side and are constructed of a flexible material. These fingers have ridges 252 with a slanted front, similar to fingers 212. The rear section 230 has two holes 254 of substantially the same size as the fingers 250. When the front section 220 and the rear section 230 are connected, the fingers 250 pass through the holes 254. The ridges 252 protrude slightly beyond the holes 254, but the slanted front of the ridges causes the fingers to bend such that they can pass through the holes 254. Once through the holes, the ridges create an interference fit between the front section 220 and the rear section 230, thereby forming the case 233.

FIG. 7 shows details of the ridges 214 at the end of the fingers 212, protruding slightly beyond the hole in the back side of the outer casing 230 and hold the drive stud 200 in place against the force caused by the spring 215 (hidden in FIGS. 6-7).

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A window treatment system attached to a stationary member, said system comprising:

a window covering adapted for mounting on the stationary member;

a control cord selectively operating said window covering and including a lower section with two parallel portions defining a plane and being connected by an intermediate portion; and a tensioning device selectively applying a tension on said cord, when attached to the stationary member, said tensioning device including a cord receiving member with said intermediate portion being in contact with said cord receiving member and a disabling mechanism defining with said cord receiving member a first configuration in which said cord is prevented from moving with respect to said tensioning device when said tensioning device is detached from the stationary member;

said disabling mechanism and said cord receiving member defining a second configuration when said tensioning device is attached to said stationary member, in which second configuration said control cord is allowed to move with respect to said tensioning device when said tensioning device is attached to the stationary member, said disabling mechanism moving substantially perpendicularly with respect to said plane between said first and second configurations;

wherein said intermediate portion being trained around the cord receiving member, and wherein said disabling mechanism is a drive stud moving perpendicularly with respect to said parallel portions between said two configurations;

wherein said drive stud forms an axis of rotation for said cord receiving member in said second configuration.

2. The window treatment system of claim 1 further comprising an attaching member selectively attaching said tensioning device to said stationary member.

3. A tension device adapted to restrict the operation of a window covering unit prior to installation to a frame, the window covering including a control cord, comprising:

a cord receiving member receiving a portion of said cord, including a wheel engaging said portion;

a housing receiving said cord receiving member, said housing being selectively attachable to the frame; and a locking member disposed at least partially in said housing and having a first and a second configuration dependent on position of said housing, said locking member being in said first configuration when said housing is not attached in which said first configuration said wheel and said locking member are interlocked and said wheel is prevented by said locking member from rotation and thereby interferes with the movement of the cord; and said locking member being in said second configuration when said housing is attached to said frame, in which said second configuration said locking member being disengaged from said wheel to allow said wheel to rotate and thereby not interfere with the movement of the cord;

wherein the cord includes two parallel portions connected by an intermediate portion and defining a plane, the intermediate portion being trained around the wheel, and wherein said locking member is moving substantially perpendicularly to said plane between said first and second configurations;

wherein said intermediate portion being trained around the wheel, and wherein said locking member is a drive stud moving perpendicularly with respect to said parallel portions between said two configurations;

wherein said drive stud forms an axis of rotation for said wheel in said second configuration.

* * * * *